United States Patent

Märklen

(10) Patent No.: US 9,440,625 B2
(45) Date of Patent: Sep. 13, 2016

(54) PARKING LOCK ARRANGEMENT AND MOTOR VEHICLE TRANSMISSION

(71) Applicant: GETRAG Getriebe- und Zahnradfabrik Hermann Hagenmeyer GmbH & Cie KG, Untergruppenbach (DE)

(72) Inventor: Michael Märklen, Wüstenrot (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 104 days.

(21) Appl. No.: 14/336,213

(22) Filed: Jul. 21, 2014

(65) Prior Publication Data

US 2015/0027846 A1 Jan. 29, 2015

(30) Foreign Application Priority Data

Jul. 23, 2013 (DE) .................. 10 2013 107 860

(51) Int. Cl.
*B60T 1/00* (2006.01)
*F16H 63/34* (2006.01)
*F16H 63/18* (2006.01)

(52) U.S. Cl.
CPC .......... *B60T 1/005* (2013.01); *F16H 63/3416* (2013.01); *F16H 63/3433* (2013.01); *F16H 63/18* (2013.01); *F16H 63/3466* (2013.01)

(58) Field of Classification Search
CPC .... B60T 1/005; F16H 63/34; F16H 63/3416; F16H 63/3425; F16H 63/3433; F16H 63/3458; F16H 63/3466; F16H 63/18
See application file for complete search history.

(56) References Cited

U.S. PATENT DOCUMENTS

| | | | |
|---|---|---|---|
| 2,770,326 A | 11/1956 | Wayman | |
| 6,125,983 A * | 10/2000 | Reed, Jr. | B60T 1/005 192/219.4 |
| 2005/0239596 A1 | 10/2005 | Giefer et al. | |
| 2010/0116605 A1 | 5/2010 | Mazzucchi et al. | |
| 2014/0060994 A1* | 3/2014 | Burgardt | F16H 63/3416 192/219.6 |
| 2014/0116835 A1* | 5/2014 | Heuver | F16H 63/3416 192/219.5 |

FOREIGN PATENT DOCUMENTS

| | | |
|---|---|---|
| CN | 102135177 A | 7/2011 |
| CN | 101078437 B | 7/2012 |

(Continued)

OTHER PUBLICATIONS

European Search Report dated Nov. 14, 2014 in application No. 14178220.1.

*Primary Examiner* — Jacob S Scott
(74) *Attorney, Agent, or Firm* — Knobbe Martens Olson & Bear LLP

(57) ABSTRACT

A parking lock arrangement for a motor vehicle transmission has a blocking arrangement actuatable between a release position and a blocking position. The blocking arrangement is designed to immobilize a motor vehicle in the blocking position. The parking lock arrangement has an arrangement for actuating the blocking arrangement. The actuating arrangement has a cam disc supported on a housing and driveable for rotation and has an actuating cam portion that extends over a first circumferential region of the cam disc that is greater than 5° and less than 180°. The actuating arrangement has a lever supported pivotably on the housing and coupled to the blocking arrangement. The lever is connected to a driving feature that is coupled to the cam disc, such that, when the cam disc is rotated, the driving feature is taken along by the actuating cam portion in such a way that the lever is pivoted in order to actuate the blocking arrangement.

17 Claims, 4 Drawing Sheets

(56) References Cited

FOREIGN PATENT DOCUMENTS

| | | |
|---|---|---|
| DE | 10326118 A1 | 1/2005 |
| DE | 20 2008 001 760 U1 | 4/2008 |
| DE | 10 2012 007 061 A1 | 10/2013 |
| EP | 1 865 237 A1 | 12/2007 |
| JP | 11-30331 | 2/1999 |
| JP | 2002-250440 A | 9/2002 |
| JP | 2011-084187 A | 4/2011 |
| TW | 200819663 | 5/2008 |

* cited by examiner

PARKING LOCK ARRANGEMENT AND MOTOR VEHICLE TRANSMISSION

CROSS-REFERENCE TO RELATED APPLICATIONS

This application claims the priority of German patent application DE 10 2013 107 860.5 filed Jul. 23, 2013.

BACKGROUND OF THE INVENTION

The invention relates to a parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement.

The present invention furthermore relates to a motor vehicle transmission having a parking lock arrangement of this kind.

Parking lock arrangements are generally used in automatic transmissions, such as converter-type automatic transmissions, automated shift transmissions or dual clutch transmissions.

The blocking arrangement of a parking lock arrangement of this kind often comprises a parking lock wheel, which has a tooth system comprising teeth and tooth gaps. The parking lock wheel is generally fixed on an output shaft of the transmission but can also be fixed on an element of a differential. Consequently, the parking lock wheel is coupled directly to a drive output of the motor vehicle. A blocking arrangement of this kind furthermore generally comprises a parking lock pawl, which has a pawl tooth. The parking lock pawl is supported on a housing in such a way as to be pivotable between the release position and the blocking position.

Translatory systems are known for moving the parking lock pawl between the release position and the blocking position. Here, the blocking arrangement generally comprises a control member which can be moved in translation, wherein an actuating member in the form of a sliding key is supported on the control member. The sliding key is supported on the housing and, in one longitudinal position, pushes the parking lock pawl in the direction of the parking lock wheel, causing the pawl tooth to engage in a tooth gap of the parking lock wheel. In another longitudinal position, the actuating member releases the parking lock pawl, allowing it to pivot into the release position. A known practice here is to provide a retaining spring, which preloads the parking lock pawl into the release position.

Rotary systems are furthermore known for moving the parking lock pawl. In this case, a cam is supported on a shaft and either pushes the parking lock pawl into the blocking position or releases it when the shaft is rotated.

In some cases, the blocking arrangement is actuated while the pawl tooth is resting on a tooth of the parking lock wheel. In this case, provision is generally made to provide a spring arrangement between the control member and the actuating member, the spring being loaded during the movement of the control member and storing energy in order to ensure that the actuating member is moved further and can push the parking lock pawl into the blocking position if the parking lock wheel is rotated further.

In general, it is a known practice to manually actuate parking lock arrangements of this kind, e.g. by means of a selector lever in the interior of the vehicle. Alternatively, there is a known practice of actuating parking lock arrangements by means of an actuator, which can be designed as a hydraulic actuator, as an electromechanical actuator or as an electromagnetic actuator.

The actuator can act either in a translatory manner, like a hydraulic cylinder for example, or in a rotary manner, like an electric motor for example. Often, the actuating arrangements of such parking lock arrangements therefore comprise rotation/translation converters.

Document EP 1 865 237 A1 discloses a parking lock arrangement for a quad bike, in which an actuating mechanism has a cam rigidly fixed on a selector drum. A parking lock pawl is designed as a first-class lever, which, at one end, has a cam follower and, at the other end, has a pawl tooth, which engages in a tooth gap of a parking lock wheel in the blocking position. Here, the parking lock pawl is preloaded into a release position by means of a retaining spring. A further spring arrangement can be integrated into the cam follower as an energy storage device for the case where one tooth is resting on another.

Document DE 20 2008 001 760 U1 discloses a parking lock arrangement with a rotary actuation of a parking lock pawl, wherein a rotatable cam engages on a pawl back of a parking lock pawl. The cam is supported on a shaft which can be rotated by means of an actuating lever. Further parking lock arrangements with a rotary actuating system are known from DE 10 2006 043 662 A1 and DE 2101822 A.

Document DE 10 2010 054 911 A1 furthermore discloses a parking lock arrangement in which a slotted link element, which acts as an RT converter, is rotated by means of an electric motor and of a spur gear transmission. The slotted link element is connected to a sliding key of a blocking arrangement.

Document U.S. Pat. No. 2,653,689 A discloses designing a parking lock arrangement as a first-class lever, one end of which has a pawl tooth. The other end of the parking lock pawl is connected by a lever mechanism that has two further levers to an actuating rod which, in turn, is moved in translation by means of a cam.

SUMMARY

Given the above background, it is an object of the invention to indicate an improved parking lock arrangement and a motor vehicle transmission fitted therewith, wherein the actuating arrangement can be actuated by means of a rotary actuator but preferably uses only a small angular range of the rotary actuator for parking lock actuation. It should furthermore preferably be possible to span relatively large distances in the vehicle transmission between such a rotary actuator and the blocking arrangement.

The above objective is achieved in the case of the parking lock arrangement mentioned at the outset by virtue of the fact that the actuating arrangement has a housing, a cam disc, which is supported on the housing and is driveable around an axis of rotation and which has an actuating portion that extends over a first circumferential region of the cam disc that is greater than 5° and less than 180°, and has a lever, which is supported pivotably on the housing and is coupled to the blocking arrangement, wherein the lever is connected to a driving feature that is coupled to the cam disc, such that, when the cam disc is rotated, the driving feature is taken along by the actuating cam portion in such a way that the lever is pivoted in order to actuate the blocking arrangement.

The cam disc can be driveable by means of an electric motor, for example. The cam disc is preferably fixed on a selector drum. Here, it is ensured that only a relatively small first circumferential region is assigned to the actuation of the parking lock arrangement, said region being less than 180°, preferably less than 90°, and, in particular, less than 30°. Consequently, when the cam disc is mounted on a selector drum the remaining circumferential region can be used for other functions (in particular shifting functions for shifting gear stages of the motor vehicle transmission) without affecting the parking lock arrangement.

By means of the measure of pivotably supporting on the housing a lever which is coupled by means of a driving feature to the cam disc, it is possible to convert relatively small rotations of the cam disc into relatively large translatory movements. In this case, the driving feature is preferably moved substantially radially in relation to the axis of rotation of the cam disc.

In this case, an axis of rotation of the lever is preferably aligned parallel to an axis of rotation of the cam disc.

Consequently, the parking lock arrangement can be of compact construction overall. By coupling the lever to the blocking arrangement, it is possible to span relatively large distances between the cam disc and the blocking arrangement.

The blocking arrangement preferably comprises a parking lock wheel and a parking lock pawl of the type described above. In this case, the blocking arrangement can have an actuating member in the form of a sliding key which is supported on the housing and actuates the parking lock pawl by means of a translatory actuation. As an alternative, the blocking arrangement can be actuated in a rotary manner. In this case, a control member of the blocking arrangement is coupled to the lever in a suitable manner.

Consequently, the parking lock arrangement is suitable for actuation by means of an actuator but can also be actuated manually. While prior art selector drums, which are generally driven by electric motor, are arranged spatially close to the blocking arrangement, if used as a drive element for a parking lock arrangement, the present invention makes it possible for the blocking arrangement to be arranged at a relatively long distance from a selector drum of this kind.

The object is thus fully achieved.

In general, it is conceivable for the actuating cam portion of the cam disc to be designed as a cam lobe portion. In this case, the actuating arrangement can be used to move the blocking arrangement from the release position into the blocking arrangement, for example. For the movement back into the release position, the actuating arrangement must then generally be preloaded into a home position.

However, it is particularly advantageous if the actuating cam portion is designed as a slotted link portion with a link slot, within which the driving feature is guided on two sides, thus allowing the lever to be pivoted positively in two directions.

In this embodiment, the cam disc can be used to provide an actuating force for transfer into the blocking position and also an actuating force for transfer of the actuating arrangement (and/or of the blocking arrangement) into a home position or release position.

According to another preferred embodiment, the cam disc has a second circumferential region, which is preferably larger than the first circumferential region, wherein the second circumferential region is configured in such a way that the lever can remain in a home position when the driving feature is in the second circumferential region.

The cam disc is preferably of circular design in this second circumferential region, with the result that the driving feature is not moved within the second circumferential region during rotations of the cam disc. In this case, the position reached by means of the driving feature for the lever preferably corresponds to a home position of the actuating arrangement, which corresponds to the release position of the blocking arrangement.

In a first preferred embodiment, the driving feature is arranged within the second circumferential region on an outer circumference of the cam disc. A simple design which can be produced at low cost is thereby achieved.

In this case, it is particularly advantageous if the actuating cam portion has a catching portion adjacent to the second circumferential region, said catching portion extending beyond the outer circumference of the second circumferential region and forming an outlet opening of the actuating cam portion.

Consequently, if the cam disc is rotated in such a way that the driving feature enters the region of the inlet opening of the actuating cam portion, it is pulled into the actuating cam portion as the cam disc is rotated further, more specifically radially inwards in relation to an axis of rotation of the cam disc.

However, it is particularly advantageous if the second circumferential portion is designed in such a way that the lever is held in the home position, wherein it is preferred if the cam disc is also designed as a slotted link portion in the second circumferential region, having a link slot within which the driving feature is guided on two sides, thus ensuring that the lever necessarily remains in the home position. In this case, the slotted link portion of the second circumferential portion is preferably arranged on a circular path.

This measure ensures that when the driving feature is arranged in the second circumferential region, accidental actuation of the blocking arrangement can be prevented. Consequently, a kind of retention for the parking lock arrangement is thereby established within the second circumferential region.

When the actuating cam portion is designed as a slotted link portion with a link slot, the link slot can extend in the manner of a chord of a circle as a slot in the cam disc.

If the second circumferential portion likewise has a slotted link portion, the slotted link portions of the actuating cam portion and the second circumferential region can merge into one another in the circumferential direction.

Overall, it is furthermore advantageous if the actuating cam portion has a substantially linear or arc-shaped portion which extends at an angle in a range of from 15° to 80°, preferably in a range of from 20° to 60°, in relation to a radial direction (of the cam disc).

Overall, it is furthermore advantageous if the actuating cam portion extends over an angular range of less than 25°.

In a preferred embodiment, the lever has a fulcrum which is arranged radially adjacent to an outer circumference of the cam disc.

It is thereby possible, on the one hand, to achieve a compact construction. On the other hand, however, it is possible to achieve relatively large pivoting movements of the lever in the case of actuating cam portions which extend only over a relatively small first circumferential region.

In this case, the fulcrum is preferably arranged on or adjacent to a radius, in relation to an axis of rotation of the cam disc, which is equal to a radius of the driving feature when the latter is arranged within the second circumferential region on an outer circumference of the cam disc.

In a preferred embodiment, the lever is designed as a second-class lever. In this case, the coupling with the blocking arrangement can be arranged radially to the inside of the driving feature (in relation to the fulcrum of the lever). However, it is preferable if the driving feature is connected to the lever at a position which is arranged between the end of the lever (or the coupling with the blocking arrangement) and the fulcrum of the lever. In this case, the driving feature is preferably arranged closer to the fulcrum than to the location of coupling with the blocking arrangement.

In an alternative embodiment, the lever is designed as a first-class lever with a first arm and a second arm, wherein the driving feature is connected to the first arm and wherein the second arm is coupled to the blocking arrangement.

In both embodiments, the transmission ratio resulting from the ratio of the lever lengths can be adjusted by means of the lever.

Overall, it is advantageous if the blocking arrangement has a parking lock pawl which can be pivoted about a pawl axis, wherein a fulcrum of the lever is closer to the axis of rotation of the cam disc than to the pawl axis.

In this case, a relatively large distance can be established between the lever or the cam disc and the blocking arrangement.

It is furthermore advantageous if the actuating arrangement has a housing and a lever, which is supported pivotably on the housing and is coupled to the blocking arrangement, wherein the lever is coupled to and can be pivoted by a driving device in order to actuate the blocking arrangement.

In conjunction with the preamble of claim 1, this embodiment is regarded as a separate invention in accordance with a second aspect.

In this case, it is possible, in particular, for the lever to be a second-class lever or a first-class lever, which is coupled at one arm to the driving device and at the other arm to the blocking arrangement.

In the inventions according to the first and the second aspect, it is advantageous if the coupling between the lever and the blocking arrangement is formed by a first pivot joint.

It is thereby possible to convert the rotary or pivoting movement of the lever into a substantially linear or translatory movement for the blocking arrangement. Here, the first pivot joint preferably has a pivot joint axis which is aligned parallel to an axis of rotation of the cam disc and parallel to an axis of rotation of the lever.

It is furthermore advantageous overall if the blocking arrangement has a transmission member which can be moved substantially in translation and is connected to the lever by a first pivot joint.

The transmission member, which can be produced from a metal sheet for example, can cross relatively large distances as far as the actual blocking arrangement, i.e. as far as a remotely arranged parking lock pawl.

At the other axial end of the transmission member, the transmission member can be guided in relation to the housing by means of a linear guide (e.g. in the form of a slotted hole in the transmission member). In an alternative embodiment, the transmission member can be coupled at its other axial end to a further member of the parking lock arrangement by means of a further pivot joint.

It is furthermore advantageous overall if the blocking arrangement has a control member, which is moved substantially in rotation or translation during the actuation of the parking lock arrangement.

It is preferred here if the control member is connected to the transmission member by a second pivot joint.

In the case of a control member which can be moved in translation, it is preferred if the second pivot joint accepts relative rotations between the control member and the transmission member in an angular range of less than 10°. In this case, the control member and the transmission member are furthermore preferably aligned approximately parallel. If the control member can be moved in rotation, e.g. in the manner of a blocking lever, as disclosed in document DE 20 2008 001 760 U1, which is fully incorporated by reference, the second pivot joint can also accept somewhat larger angular ranges of relative rotation between the control member and the transmission member. In this variant, the control member and the transmission member are preferably arranged at an angle to one another in a home position, more specifically in a range of from 20° to 170°, in particular in a range of from 70° to 110°, for example.

In an alternative variant, the control member and the transmission member can be designed to be integral with one another.

It is furthermore advantageous if an actuating member, which is coupled to a parking lock pawl of the blocking arrangement, is supported with a limited ability for translation or rotation on the control member.

In this case, the actuating member can have a wedge surface which is supported on a housing portion and engages in the manner of a sliding key on a back of the parking lock pawl in order to push the latter from the release position into the blocking position, for example. As an alternative, the actuating member can be designed as a cam, which is supported for limited rotation on a control lever.

As in the prior art, the actuating member can in this case be coupled to a spring arrangement, which stores energy for the case where the parking lock arrangement has engaged in a position where the pawl tooth is resting on a wheel tooth, said energy ensuring that the parking lock pawl is pushed into a tooth gap as the parking lock wheel is rotated further.

In all the embodiments described above, the driving feature can be rigidly connected to the lever and, in this case, can, in particular, be formed integrally with the lever. As an alternative, the driving feature can be supported rotatably or with the ability for limited rotation on the lever, with an axis of rotation which is aligned parallel with an axis of rotation of the lever. The driving feature can be of circular design but can also have a diamond shape, in particular with rounded points.

It is self-evident that the features mentioned above and those which remain to be explained can be used not only in the respectively indicated combination but also in other combinations or in isolation without exceeding the scope of the present invention.

BRIEF DESCRIPTION OF THE DRAWING

Illustrative embodiments of the invention are shown in the drawing and are explained in greater detail in the following description. In the drawing.

PREFERRED EMBODIMENTS

Figure 1:
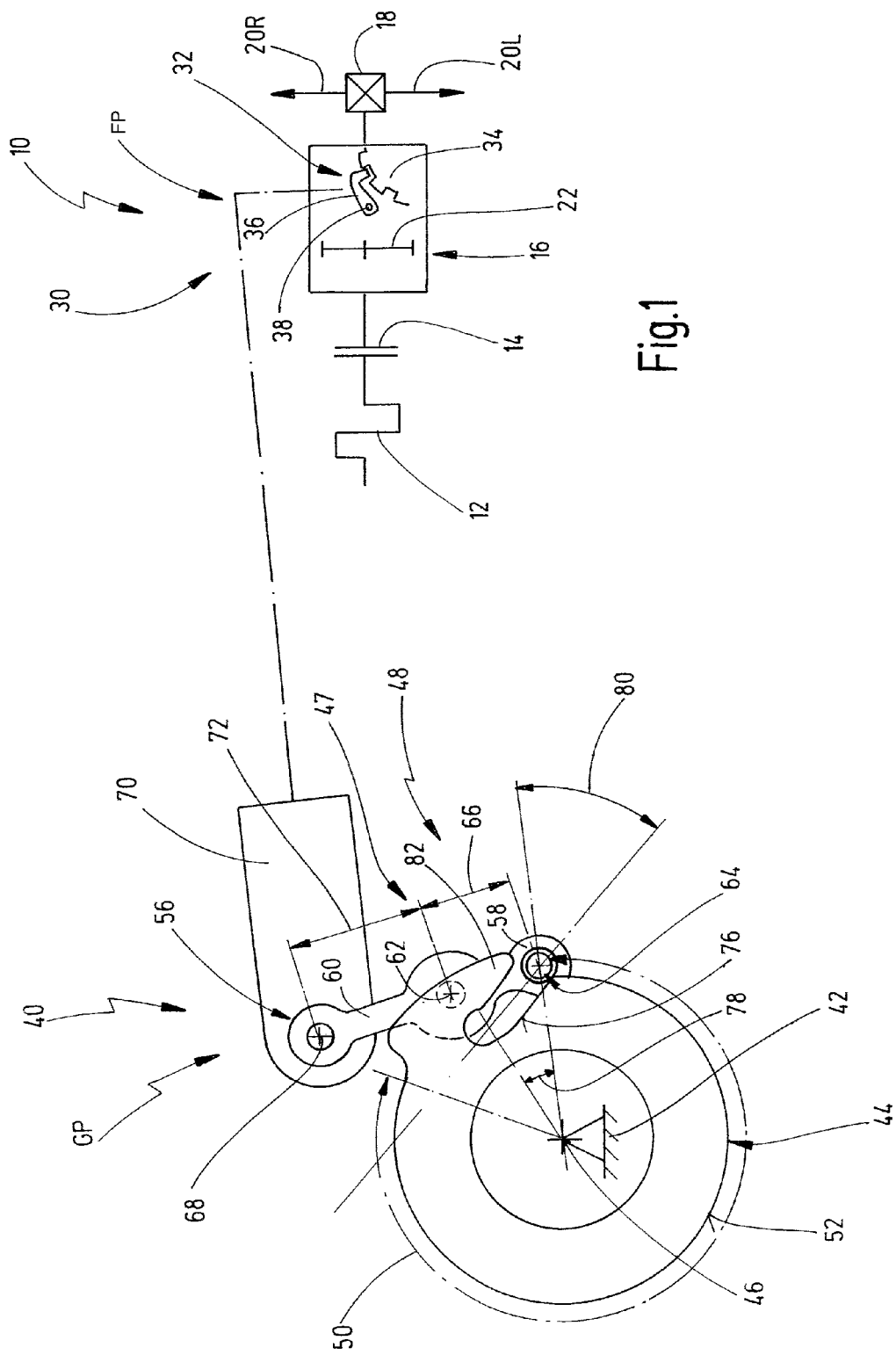
FIG. 1 shows a schematic illustration of a drive train of a motor vehicle having an embodiment of a parking lock arrangement according to the invention in a release position.

A drive train for a motor vehicle is illustrated schematically in FIG. 1 and denoted overall by 10. The drive train 10 has a drive motor 12, such as an internal combustion engine, an electric motor or the like. The drive train 10 furthermore comprises a clutch device 14 and a transmission 16. An output of the transmission 16 is connected to a differential 18, by means of which motive power is distributed between driven wheels 20L, 20R.

The transmission 16 can be embodied as a layshaft transmission of spur-gear design, for example, and has gearsets for setting up gear stages, of which one is shown by way of example at 22. The transmission can have two gear stages, for example, but can have five, six, seven or more gear stages. In particular, the transmission can be an automated transmission, such as an automated shift transmission or a dual clutch transmission. In particular, the gear stages can be actuated by means of one or more selector drums, wherein, in the case of a dual clutch transmission, each component transmission is preferably assigned a dedicated selector drum, so that one selector drum operates gear stages 1, 3, 5, 7 and the other selector drum operates gear stages 2, 4, 6, for example. The reverse gear stage is preferably assigned to the second selector drum. One of the two selector drums, preferably the selector drum to which the reverse gear stage is also assigned, can furthermore be used to actuate a parking lock arrangement 30 of the transmission 16, thus establishing a "park-by-wire" function.

As illustrated schematically in FIG. 1, the parking lock arrangement 30 comprises a blocking arrangement 32 having a parking lock wheel 34, which is fixed on an output shaft of the transmission 16 or on an element of the differential 18, for example. The blocking arrangement 32 furthermore comprises a parking lock pawl 36, which is supported on a housing in such a way as to be pivotable between a release position and a blocking position, more specifically about a pawl axis 38. In FIG. 1, the blocking arrangement 32 is shown schematically in a release position FP.

Figure 2:
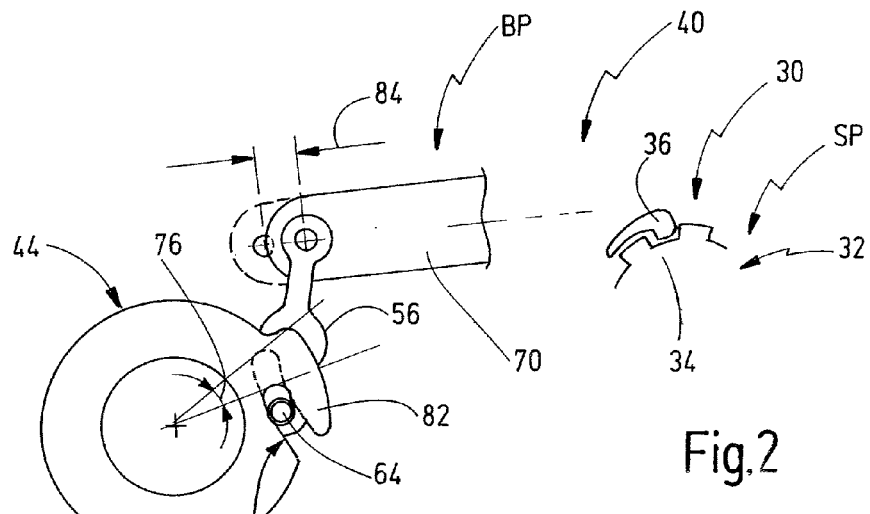
FIG. 2 shows the parking lock arrangement of FIG. 1 in a blocking position.

The parking lock arrangement 30 furthermore comprises an actuating arrangement 40, which can be moved between an actuating position and a home position GP, which is illustrated in FIG. 1. The home position GP is assigned to the release position FP. As shown in FIG. 2, the actuating position BP of the actuating arrangement 40 is assigned to the blocking position SP of the blocking arrangement 32.

The actuating arrangement 40 comprises a housing 42, which can be part of a housing of the transmission 16, for example. The actuating arrangement 40 furthermore has a cam disc 44, which in the present case is designed as a slotted disc. The cam disc 44 is supported on the housing 42 in such a way as to be pivotable about an axis of rotation 46 and can be rotated by means of a driving device (not shown). The driving device can be coupled to a manual selector lever. However, the cam disc 44 is preferably driven by means of an electric motor. It is particularly preferred if the cam disc 44 is fixed on a selector drum, and this will be described below.

An actuating cam portion 47 is formed on the cam disc 44, said portion being arranged within a first circumferential region 48 of the cam disc 44. The cam disc 44 furthermore has a second circumferential region 50, which in the present case extends over at least 270°, in particular at least 280°. Within the second circumferential region 50, the cam disc 44 has an outer circumference 52, which has a constant radius, i.e. approximates to a circular form.

The actuating arrangement 40 furthermore comprises a lever 56, which in the present case is designed as a first-class lever with a first arm 58 and a second arm 60. The lever 56 is supported pivotably on the housing, more specifically at a fulcrum 62. As seen in the radial direction of the cam disc 44, the fulcrum 62 is arranged adjacent to the outer circumference 52 of the cam disc 44. In other words, the ratio of the distance of the fulcrum 62 from the axis of rotation 46 and the radius of the outer circumference 44 is preferably greater than 0.7 and less than 1.5.

A driving feature 64, which can be formed by a pin or nose portion extending parallel to the axis of rotation 46, is formed on the first arm 58 in the region of the free end of the first arm 58. In cross section, the driving feature 64 preferably has a circular shape.

A first lever length 66 is defined by the distance between the fulcrum 62 and the driving feature 64.

In the region of its free end, the second arm 60 has a pivot joint 68, by means of which the lever 56 is coupled to a transmission member 70. The pivot joint 68 is not fixed in relation to the housing 42. The distance between the pivot joint 68 and the fulcrum 62 defines a second lever length 72.

The ratio of the first lever length 66 to the second lever length 72 is preferably less than 1 and preferably greater than 0.5.

In the present case, the actuating cam portion 47 is designed as a slotted link portion with a link slot 76, which is formed in the cam disc 44 in the manner of a slot extending in the form of a chord of a circle.

The link slot 76 extends in the circumferential direction of the cam disc 44 over an angle 78 which is preferably less than 30° and, in particular, less than 25°. Furthermore, the link slot 76 is aligned in relation to a radial direction of the cam disc 44 at an angle 80 which can be in a range of from 15 to 80°, in particular in a range of from 20° to 60°.

The actuating cam portion 47 furthermore comprises a catching portion 82. The catching portion 82 is formed by an arm which extends substantially in a tangential direction, forms a radial outer side of the link slot 76 and extends beyond the outer circumference 52 of the second circumferential portion 50 in such a way that the catching portion 82 forms an inlet opening of the actuating cam portion 47. In other words, from the position shown in FIG. 1, in which the driving feature 64 is arranged in the region of a transition between the first and the second circumferential region, the driving feature 64 is caught by the catching portion 82 as the cam disc 44 is rotated further in a clockwise direction and pulled into the link slot 76, whereby the lever 56 is pivoted, as illustrated in FIG. 2.

Here, the cam disc is rotated by less than 25°, but this results in a relatively large actuating path 84 of the transmission member 70, which is coupled to the lever 56 by the pivot joint 68.

As the cam disc is rotated back anticlockwise, the driving feature is pushed out of the link slot by the radially inner contour of the link slot 76 until the state shown in FIG. 1 has once again been reached. It is possible to rotate the cam disc 44 further in the anticlockwise direction over the entire second circumferential region 50 without the driving feature 64 being influenced thereby. During this process, the driving feature 64 runs (or rolls) on the outer circumference 52 of the cam disc 44 within the second circumferential region 50. Consequently, the transmission member 70 remains in the home position shown in FIG. 1 and, owing to the coupling between the driving feature 64 and the outer circumference 52, cannot be moved in the direction of the actuating position BP shown in FIG. 2 either. If required, the transmission member 70 can furthermore be restrained from a movement out of the home position GP counter to the actuating direction by means of a stop, a spring or the like. This is preferably accomplished by means of a linear guide of the kind which will be described below.

Figure 3:
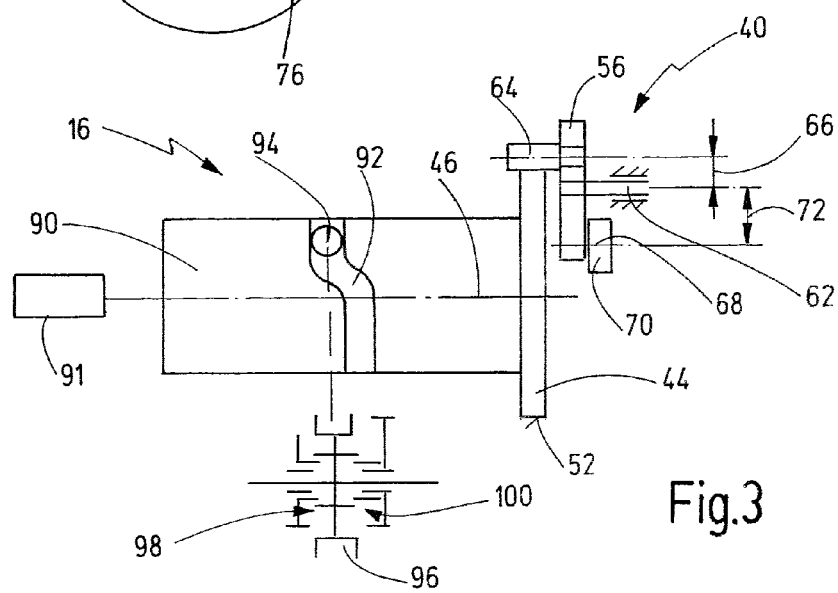
FIG. 3 shows a radial view of a selector drum of a motor vehicle transmission having an actuating arrangement of a parking lock arrangement according to the invention.

FIG. 3 shows, in a radial view, a selector drum 90, which can be rotated about an axis of rotation by means of an electric motor 91, said axis of rotation coinciding with the axis of rotation 46 of the cam disc 44. In this arrangement, the cam disc 44 is fixed on the selector drum 90, e.g. on an axial end thereof.

The selector drum 90 comprises at least one selector contour 92, in which a finger of a selector fork 94 engages. In this arrangement, the selector fork 94 can be coupled to a sliding sleeve 96, which is used to actuate a first selector clutch 98 and/or a second selector clutch 100. The selector clutches 98, 100 can be used, for example, to connect free gears of respective gear wheel sets of the transmission 16 for conjoint rotation to an associated shaft in order in this way to engage an associated gear stage.

FIG. 3 furthermore shows schematically the lever 56 and the driving feature 64, which rests on the outer circumference 52 of the second circumferential region 50 in the illustration shown in FIG. 3. FIG. 3 furthermore shows schematically the lever lengths 66, 72 and the pivot joint 68 for coupling to the transmission member 70.

Figure 4:
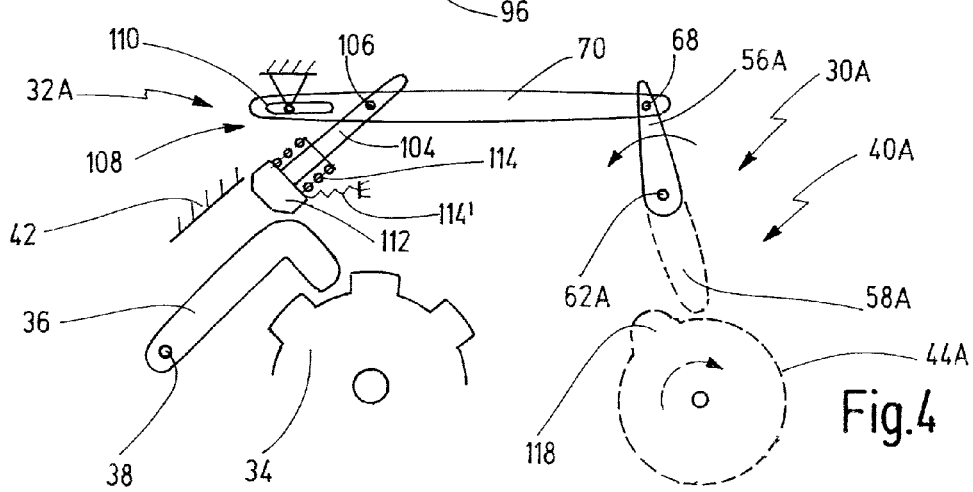
FIG. 4 shows a schematic illustration of another embodiment of a parking lock arrangement according to the invention.

FIG. 4 shows another embodiment of a parking lock arrangement 30A, which can correspond in general as regards construction and operation to the parking lock arrangement described above. Identical elements are therefore denoted by identical reference signs. It is essentially the differences which are explained below.

The parking lock arrangement 30A in FIG. 4 has an actuating arrangement 40A, having a lever 56A, which can be formed as a second-class lever, for example, and is coupled by means of a pivot joint 68 to a transmission member 70. The lever 56A can be pivoted in any desired manner, e.g. by means of a manual operating mechanism or by means of an actuator. It is also possible to design the lever 56A as a first-class lever with a first arm 58A which interacts with a cam disc 44A.

In the present case, the blocking arrangement 32A comprises a control member 104, which is coupled to the transmission member 70 by a second pivot joint 106. The opposite end of the transmission member 70 from the pivot joint 68 is guided in a linear guide 108 fixed relative to the housing, being guided by means of a longitudinal slot 110 in the transmission member 70 for example, wherein a pin fixed relative to the housing engages in the longitudinal slot 110.

An actuating member 112 is supported on the control element 104 in a manner which allows limited movement. The actuating member 112 is coupled to the control member by means of a spring arrangement 114 (or coupled to the housing by means of a spring arrangement 114').

The spring arrangement 114 (or 114') serves as an energy storage device during the engagement of the parking lock arrangement in a situation where the pawl tooth is resting on a parking lock wheel tooth.

As illustrated in FIG. 4, the actuating member 112 is designed as a wedge element, which, to transfer the parking lock arrangement 30A into a blocking position, can be pushed between a portion of the housing 42 and a back of the parking lock pawl 86 in order to pivot the parking lock pawl 36 to ensure that the parking lock tooth thereof engages in a tooth gap of the parking lock wheel 34.

It can be seen that the provision of a transmission member 70 which is coupled to a lever 56A by a pivot joint 68 enables a relatively large distance to be established between the actuating arrangement 40A and the region of the parking lock pawl 36.

FIG. 4 furthermore shows in schematic form that the cam disc 44A can have a cam lobe 118 instead of a link slot in order to actuate the lever 56A positively at least in one direction when the cam disc 44A is rotated in a suitable manner.

FIGS. 5 to 8 show a further embodiment of a parking lock arrangement 30, the actuating arrangement 40 of which corresponds to FIGS. 1 to 3. In principle, the blocking arrangement 32 is constructed like the blocking arrangement 32A in FIG. 4. Identical elements are therefore denoted by identical reference signs. It is essentially the differences which are explained below. In FIGS. 5 to 8, as in the above figures, a cross indicates a point of support fixed in relation to the housing, while a black circle represents a pivot joint that is not fixed in relation to the housing.

Whereas, in the parking lock arrangement 30A in FIG. 4, the control member 104 is aligned at an angle greater than 20° in relation to a longitudinal extent of the transmission member 70, the control member 104 and the transmission member 70 in the embodiment in FIGS. 5 to 8 are aligned approximately parallel. The second pivot joint 106 need only be designed to accept relatively small relative angles since the transmission member 70 is moved approximately in translation as the lever 56 pivots. Owing to the approximately parallel alignment of the control member 104 and transmission member 70, the pivot joint 106 furthermore does not need to accept high forces over the entire range of rotation.

Figure 5:
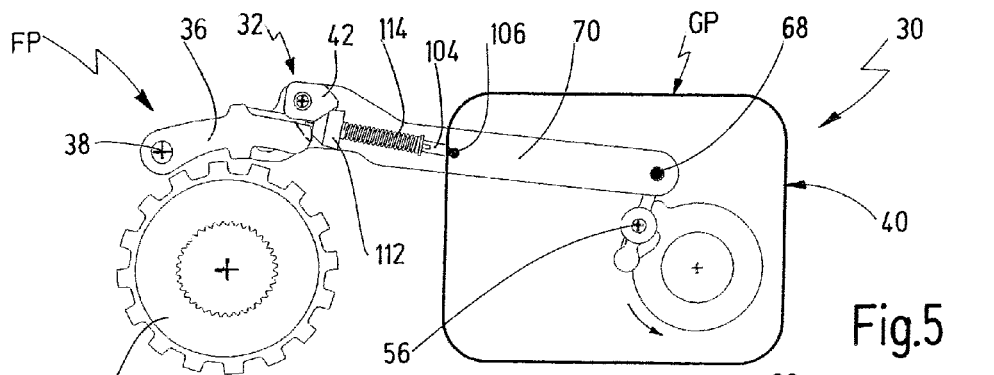
FIG. 5 shows a front view of another embodiment of a parking lock arrangement according to the invention in a release position.
Figure 6:
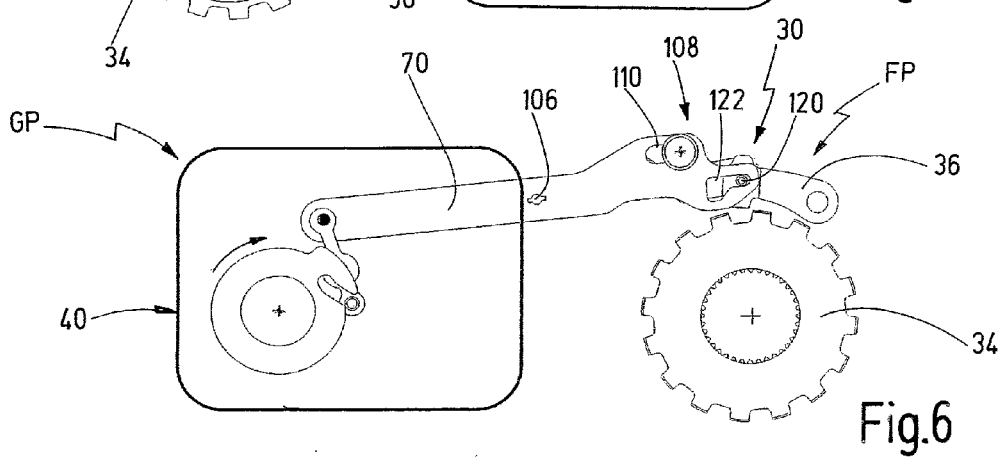
FIG. 6 shows a rear view of the parking lock arrangement of FIG. 5 in the release position.

It can be seen from FIG. 6, which shows a rear side of the parking lock arrangement 30 in FIG. 5, that the transmission member 70 can have formed on it a pawl link slot 122, in which a pawl pin 120 engages which is connected rigidly to the parking lock pawl 36 and extends in a direction parallel to the pawl axis 38, to the side of the parking lock pawl 36. The pawl 122 is designed in such a way that it holds the parking lock pawl 36 positively in the release position FP shown in FIGS. 5 and 6. It is therefore unnecessary to preload the parking lock pawl 36 into the release position FP by means of a retaining spring or the like.

Figure 7:
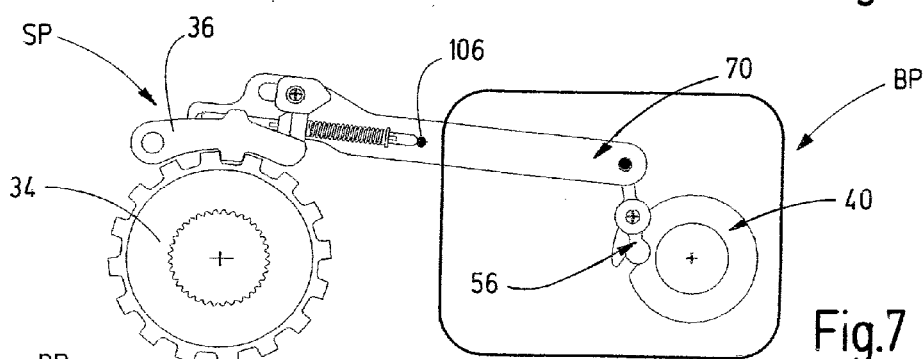
FIG. 7 shows a front view of the parking lock arrangement in FIGS. 5 and 6 in a blocking position.
Figure 8:
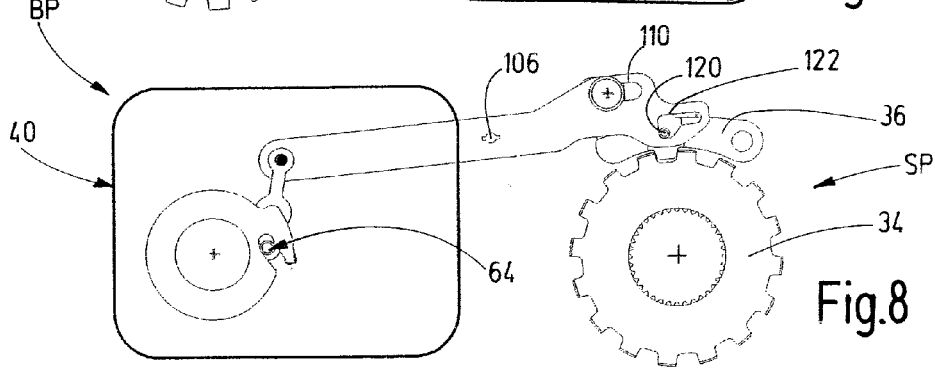
FIG. 8 shows a rear view of the parking lock arrangement in FIGS. 5 to 7 in a blocking position.

In FIGS. 7 and 8, the parking lock arrangement 30 in FIGS. 5 and 6 is shown in the blocking position SP. Here, the pawl link slot 122 is designed in such a way that it permits a pivoting movement of the parking lock pawl 36 in a direction towards the parking lock wheel 34. At the same time, the pawl link slot 122 has a wedge surface in order to raise the parking lock pawl back into the release position FP from the blocking position SP shown in FIG. 8 when the transmission member 70 is transferred from the actuating position BP shown in FIG. 8 into the home position GP shown in FIG. 6.

In the case of the selector drum 90 illustrated above, the entire second circumferential region 50 can be used for selecting movements. The selector drum 90 is preferably used to operate gear stages 2, 4, 6 and R of a dual clutch transmission.

In the parking lock arrangement according to the invention, a rotary movement of a selector drum 90 (or of an electric motor or the like) is converted into a linear movement in order to cover a relatively large distance between this drive and the parking lock mechanism (parking lock wheel and parking lock pawl). In this case, only a relatively small angular range of the selector drum is "occupied" by the engagement and disengagement of the parking lock arrangement, and therefore a relatively large angular range (second circumferential region 50) can be used for selecting operations, and this has no effect on the parking lock arrangement.

The cam disc 44 can be designed as a disc made of sheet metal.

The shape of the link slot 76, in particular the angle 80 and 78, and the lever lengths 66, 72 can be used to influence the circumferential length of the first circumferential region 48, the decoupling and the transmission ratio.

In some variants, the parking lock pawl can be preloaded into the blocking position SP by means of a spring, in the parking lock arrangement in FIGS. 5 to 8 for example, wherein the force for actuating the parking lock pawl into the blocking position is assisted by a spring of this kind, with the result that the actuating arrangement does not have to supply such high forces.

Figure 9:
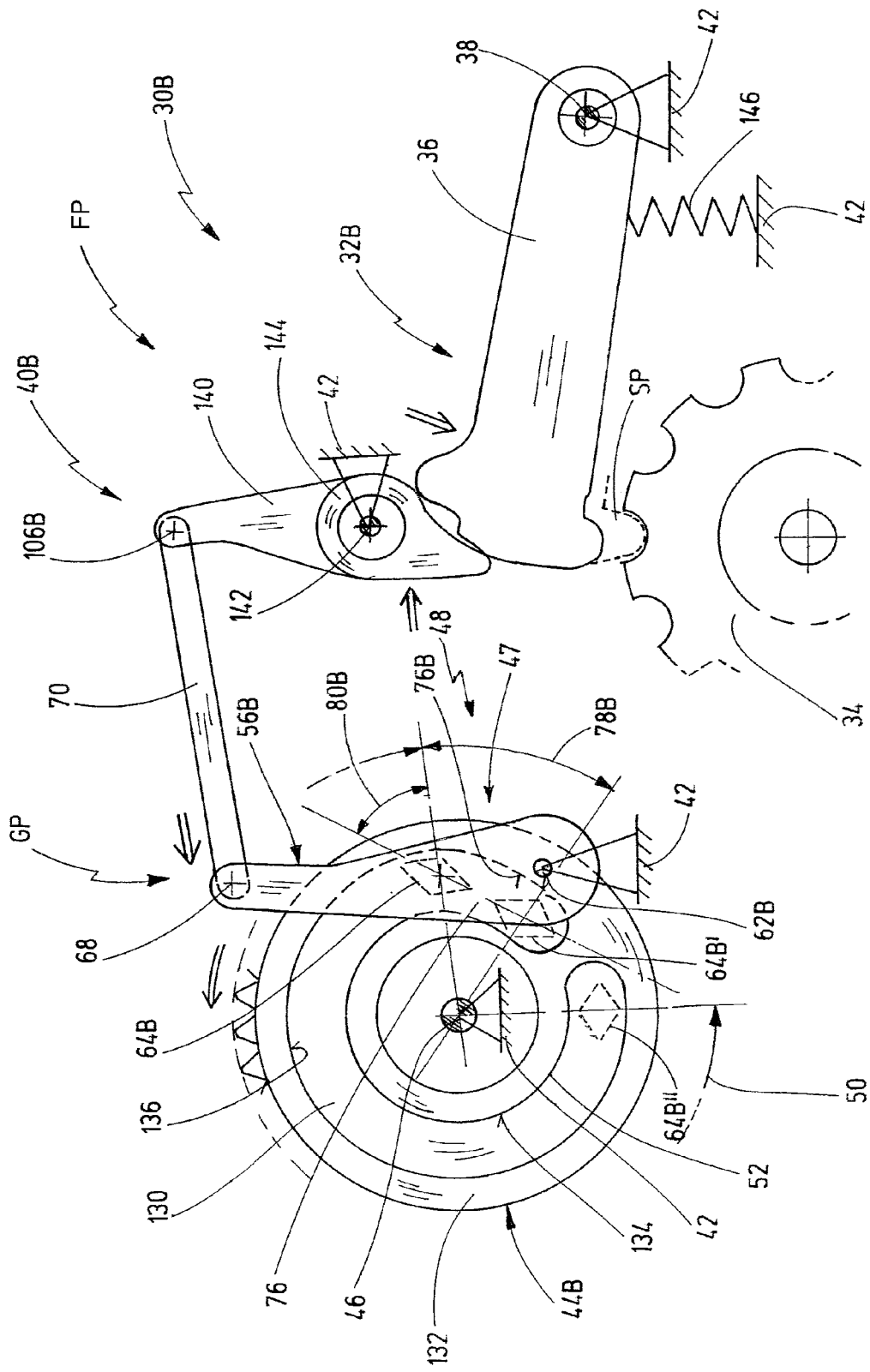
FIG. 9 shows a further embodiment of a parking lock arrangement according to the invention in a release position.

FIG. 9 shows another preferred embodiment of a parking lock arrangement 30B according to the invention, which corresponds in general to the parking lock arrangement 30 described above as regards construction and operation. Identical elements are therefore denoted by identical reference signs. It is essentially the differences which are explained below.

The actuating arrangement 40B of the parking lock arrangement 30B comprises a cam disc 44B, which is likewise divided into a first circumferential region 48 and into a second circumferential region 50, wherein the first circumferential region 48 extends over an angle 78B, and wherein the second circumferential region 50 adjoins the latter and extends over a larger angular range, as in the previous embodiments. Here too, the actuating cam portion 47 is designed as a slotted link portion with a link slot 76.

Here, the second circumferential region 50 likewise has a slotted link portion which adjoins the link slot 76 in a circumferential direction. In this case, the slotted link portions are preferably formed by an axial groove 130, which is formed on the face 132 of the cam disc 44B. The axial groove 130 has a groove inner circumference 134 and a groove outer circumference 136, wherein the driving feature 64B engages in an axial direction in the axial groove 130 and is consequently guided on two sides between the groove inner circumference 134 and the groove outer circumference 136. In this embodiment, a catching section 82 of the kind present in the previous embodiments is not necessary.

As in the previous embodiments, the cam disc 44B can be connected to a selector drum or can be formed integrally therewith.

The actuating arrangement 40 furthermore comprises a lever 56B, which in the present case is designed as a second-class lever. A fulcrum 62 of the lever 56B is formed close to the axial groove 130 and preferably radially to the inside of an outer circumference of the cam disc 44B. The driving feature 64B can be connected rotatably or rigidly to the lever 56B. The driving feature 64B can be designed with a circular cross section or, as illustrated, can be of diamond-shaped design with rounded points.

By virtue of the diamond shape, a low surface pressure between an outer wall of the link slot 76 and the driving feature 64B can be achieved, especially during the transfer of the parking lock arrangement into a blocking position SP.

The pivot joint 68 for rotatable coupling to the transmission member 70 is formed in the region of a free end of the lever 56B. The driving feature 64B is arranged between the pivot joint 68 and the fulcrum 62B.

This type of actuating arrangement 40B can also be combined with a translatory blocking arrangement 32, as illustrated in FIGS. 5-8. As alternative, this actuating arrangement 40B can also be combined with a rotary blocking arrangement 32B, as shown in FIG. 9. In this case, the blocking arrangement 32B has a blocking lever 140, which is supported rotatably on a blocking lever pivot 142. The blocking lever 140 is coupled to the transmission member 70 by a second pivot joint 106. A cam 144 is supported on the blocking lever 140 concentrically with the blocking lever pivot 142, allowing it to pivot to a limited extent, as described in the abovementioned document DE 20 2008 001 760 U1. In this case, the cam 144, which in the present case forms an actuating member, can be coupled to a spring arrangement, which stores energy for the case where the parking lock arrangement is engaged in a position in which the pawl tooth rests on a wheel tooth.

FIG. 9 furthermore shows that the parking lock pawl 36 in this embodiment can be preloaded into the release position FP by means of a spring 146, said position being illustrated in solid lines in FIG. 9. The blocking position SP is illustrated by dashed lines in FIG. 9.

In FIG. 9, the actuating arrangement 40 is in a home position GP. To actuate the parking lock arrangement, the cam disc 44B is rotated, as indicated by a double arrow, until the driving feature 64B is arranged at an axial end of the link slot 76, as indicated at 64B'. The lever 56B is thereby pivoted, and the transmission member 70 is moved substantially in translation, as is likewise indicated by an arrow. This, in turn, leads to pivoting of lever 140 and of the cam 144, as a result of which the parking lock pawl 36 is pushed into the blocking position SP, as likewise indicated by a double arrow.

At 64B", it is shown that the driving feature is held in the home position GP in the second circumferential region 50, thus avoiding unintentional actuation of the blocking arrangement 32B when the driving feature 64B is within the second circumferential region 50.

It is self-evident that the actuating arrangement 40 described above can also be used to actuate a blocking arrangement of the kind shown in FIG. 9 at 32B.

What is claimed is:

1. A parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement, wherein the actuating arrangement comprises:
    a housing,
    a cam disc, which is supported on the housing and is driveable around an axis of rotation and which has an actuating cam portion that extends over a first circumferential region of the cam disc that is greater than 5° and less than 180°, and a lever, which is supported pivotably on the housing and is coupled to the blocking arrangement, wherein the lever is connected to a driving feature that is coupled to the cam disc, such that, when the cam disc is rotated, the driving feature is taken along by the actuating cam portion in such a way that the lever is pivoted in order to actuate the blocking arrangement, wherein the actuating cam portion is designed as a slotted link portion with a link slot, within which the driving feature is guided on two sides, thus allowing the lever to be pivoted positively in two directions.

2. The parking lock arrangement according to claim 1, wherein the cam disc has a second circumferential region, wherein the second circumferential region is configured in such a way that the lever can remain in a home position when the driving feature is in the second circumferential region.

3. The parking lock arrangement according to claim 2, wherein the second circumferential portion is designed in such a way that the lever is held in the home position.

4. The parking lock arrangement according to claim 1, wherein the lever has a fulcrum which is arranged radially adjacent to an outer circumference of the cam disc.

5. The parking lock arrangement according to claim 1, wherein the lever is a first-class lever.

6. The parking lock arrangement according to claim 1, wherein the blocking arrangement has a parking lock pawl which can be pivoted about a pawl axis, wherein a fulcrum of the lever is closer to the axis of rotation of the cam disc than to the pawl axis.

7. The parking lock arrangement according to claim 1, wherein the lever is supported pivotably on the housing and is coupled to the blocking arrangement, wherein the lever is coupled to and can be pivoted by a driving feature in order to actuate the blocking arrangement.

8. The parking lock arrangement according to claim 1, wherein a coupling between the lever and the blocking arrangement is formed by a first pivot joint.

9. The parking lock arrangement according to claim 1, wherein the blocking arrangement has a transmission member which can be moved substantially in translation and is connected to the lever by a first pivot joint.

10. A parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement, wherein the actuating arrangement comprises:
a housing,
a cam disc, which is supported on the housing and is driveable around an axis of rotation and which has an actuating cam portion that extends over a first circumferential region of the cam disc that is greater than 5° and less than 180°, and
a lever which is supported pivotably on the housing and is coupled to the blocking arrangement, wherein the lever is connected to a driving feature that is coupled to the cam disc, such that, when the cam disc is rotated, the driving feature is taken along by the actuating cam portion in such a way that the lever is pivoted in order to actuate the blocking arrangement,
wherein the blocking arrangement has a control member, which is moved substantially in rotation or translation during the actuation of the parking lock arrangement, and wherein the blocking arrangement has a transmission member which can be moved substantially in translation and is connected to the lever by a first pivot joint, wherein the control member is connected to the transmission member by a second pivot joint.

11. The parking lock arrangement according to claim 10 further comprising an actuating member, wherein a translation or rotation of the actuating member is limited, the actuating member being coupled to a parking lock pawl of the blocking arrangement and supported on the control member.

12. A parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement, wherein the actuating arrangement has a housing and a lever, which is supported pivotably on the housing and is coupled to the blocking arrangement, wherein the lever is coupled to and can be pivoted by a driving device in order to actuate the blocking arrangement wherein the blocking arrangement has a control member, which is moved substantially in rotation or translation during the actuation of the parking lock arrangement, and wherein the blocking arrangement has a transmission member which can be moved substantially in translation and is connected to the lever by a first pivot joint, wherein the control member is connected to the transmission member by a second pivot joint.

13. The parking lock arrangement according to claim 12, wherein a coupling between the lever and the blocking arrangement is formed by a first pivot joint.

14. The parking lock arrangement according to claim 12, wherein the blocking arrangement has a transmission member which can be moved substantially in translation and is connected to the lever by a first pivot joint.

15. The parking lock arrangement according to claim 12 further comprising an actuating member, wherein a translation or rotation of the actuating member is limited, the actuating member being coupled to a parking lock pawl of the blocking arrangement and supported on the control member.

16. A parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement, wherein the actuating arrangement comprises:
a housing,
a cam disc, which is supported on the housing and is driveable around an axis of rotation and which has an actuating cam portion that extends over a first circumferential region of the cam disc that is greater than 5° and less than 180°, and
a lever, which is supported pivotably on the housing and is coupled to the blocking arrangement, wherein the lever is connected to a driving feature that is coupled to the cam disc, such that, when the cam disc is rotated, the driving feature is taken along by the actuating cam portion in such a way that the lever is pivoted in order to actuate the blocking arrangement,
wherein the actuating cam portion has a substantially linear or arc-shaped portion which extends at an angle in a range of from 15° to 80°, in relation to a radial direction.

17. A parking lock arrangement for a motor vehicle transmission, having a blocking arrangement, which can be actuated between a release position and a blocking position, wherein the blocking arrangement is designed to immobilise a motor vehicle in the blocking position, and having an actuating arrangement for actuating the blocking arrangement, wherein the actuating arrangement comprises:
- a housing,
- a cam disc, which is supported on the housing and is driveable around an axis of rotation and which has an actuating cam portion that extends over a first circumferential region of the cam disc that is greater than 5° and less than 180°, and
- a lever, which is supported pivotably on the housing and is coupled to the blocking arrangement, wherein the lever is connected to a driving feature that is coupled to the cam disc, such that, when the cam disc is rotated, the driving feature is taken along by the actuating cam portion in such a way that the lever is pivoted in order to actuate the blocking arrangement, wherein the lever is a second-class lever.

* * * * *